United States Patent
Zhang et al.

(10) Patent No.: US 8,291,170 B1
(45) Date of Patent: Oct. 16, 2012

(54) SYSTEM AND METHOD FOR EVENT DRIVEN BACKUP DATA STORAGE

(75) Inventors: Xianbo Zhang, Madison, WI (US); Weibao Wu, Vadnais Heights, MN (US); Haibin She, Beijing (CN)

(73) Assignee: Symantec Corporation, Mountain View, CA (US)

( * ) Notice: Subject to any disclaimer, the term of this patent is extended or adjusted under 35 U.S.C. 154(b) by 251 days.

(21) Appl. No.: 12/859,640

(22) Filed: Aug. 19, 2010

(51) Int. Cl.
G06F 13/00 (2006.01)

(52) U.S. Cl. ........................................ 711/135
(58) Field of Classification Search ......................... None
See application file for complete search history.

(56) References Cited

U.S. PATENT DOCUMENTS

| | | | |
|---|---|---|---|
| 5,499,367 A * | 3/1996 | Bamford et al. ............ | 1/1 |
| 5,561,421 A | 10/1996 | Smith | |
| 5,873,097 A * | 2/1999 | Harris et al. ............... | 1/1 |
| 5,990,810 A | 11/1999 | Williams | |
| 6,014,676 A | 1/2000 | McClain | |
| 6,141,784 A | 10/2000 | Davis | |
| 6,279,080 B1 * | 8/2001 | DeRoo ..................... | 711/135 |
| 6,389,433 B1 | 5/2002 | Bolosky et al. | |
| 6,513,051 B1 | 1/2003 | Bolosky et al. | |
| 6,785,786 B1 | 8/2004 | Gold et al. | |
| 6,865,655 B1 | 3/2005 | Andersen | |
| 6,920,537 B2 | 7/2005 | Ofek et al. | |
| 6,983,365 B1 | 1/2006 | Douceur et al. | |
| 7,055,008 B2 | 5/2006 | Niles | |
| 7,136,976 B2 | 11/2006 | Saika | |
| 7,146,429 B2 | 12/2006 | Michel | |
| 7,200,604 B2 | 4/2007 | Forman et al. | |
| 7,213,158 B2 | 5/2007 | Bantz et al. | |
| 7,257,104 B2 | 8/2007 | Shitama | |
| 7,257,643 B2 | 8/2007 | Mathew | |
| 7,310,644 B2 | 12/2007 | Adya et al. | |
| 7,318,072 B2 | 1/2008 | Margolus | |
| 7,359,920 B1 | 4/2008 | Rybicki et al. | |
| 7,389,394 B1 | 6/2008 | Karr | |
| 7,401,194 B2 | 7/2008 | Jewell | |
| 7,409,523 B2 | 8/2008 | Pudipeddi | |
| 7,424,514 B2 | 9/2008 | Noble et al. | |
| 7,454,592 B1 | 11/2008 | Shah | |
| 7,478,113 B1 | 1/2009 | De Spiegeleer et al. | |

(Continued)

OTHER PUBLICATIONS

"FT-NFS: An Efficient Fault-Tolerant NFS Server Designed for Off-the-Shelf Workstations," by Peyrouze & Muller. IN: Fault Tolerant Computing (1996). Available at: IEEE Xplore.*

(Continued)

*Primary Examiner* — Neveen Abel Jalil
*Assistant Examiner* — Daniel Kinsaul
(74) *Attorney, Agent, or Firm* — Rory D. Rankin; Meyertons, Hood, Kivlin, Kowert & Goetzel, P.C.

(57) ABSTRACT

A system and method for writing data segments to a backup storage medium. Data segments are sent from multiple clients to a shared backup server. The backup server writes the data segments for each client into separate container files and then flushes the data from the container files into the backup storage medium. After backing up all of the data segments from a single client, the server commits the transaction which includes flushing newly written data from any open files, closing the open files, and updating metadata for the newly written data. To reduce the amount of time needed to commit the transaction, the backup server flushes and closes container files prior to transaction commit time.

20 Claims, 6 Drawing Sheets

U.S. PATENT DOCUMENTS

| | | | |
|---|---|---|---|
| 7,971,091 B1* | 6/2011 | Bingham et al. | 714/6.12 |
| 2001/0045962 A1 | 11/2001 | Lee | |
| 2002/0107877 A1 | 8/2002 | Whiting et al. | |
| 2004/0044707 A1 | 3/2004 | Richard | |
| 2004/0143731 A1 | 7/2004 | Audebert et al. | |
| 2005/0027766 A1 | 2/2005 | Ben | |
| 2005/0198328 A1 | 9/2005 | Lee et al. | |
| 2005/0204108 A1 | 9/2005 | Ofek | |
| 2005/0216813 A1 | 9/2005 | Cutts et al. | |
| 2006/0026219 A1 | 2/2006 | Orenstein et al. | |
| 2006/0271540 A1 | 11/2006 | Williams | |
| 2007/0192548 A1 | 8/2007 | Williams | |
| 2007/0198659 A1 | 8/2007 | Lam | |
| 2007/0250674 A1 | 10/2007 | Fineberg et al. | |
| 2008/0005141 A1* | 1/2008 | Zheng et al. | 707/101 |
| 2008/0133561 A1 | 6/2008 | Dubnicki et al. | |
| 2008/0154989 A1 | 6/2008 | Arman | |
| 2008/0228939 A1 | 9/2008 | Samuels et al. | |
| 2008/0243769 A1 | 10/2008 | Arbour et al. | |
| 2008/0243953 A1 | 10/2008 | Wu et al. | |
| 2008/0244204 A1 | 10/2008 | Cremelie et al. | |
| 2008/0270461 A1* | 10/2008 | Gordon et al. | 707/103 R |
| 2010/0083003 A1 | 4/2010 | Spackman | |
| 2010/0250896 A1 | 9/2010 | Matze | |
| 2010/0257403 A1 | 10/2010 | Virk et al. | |
| 2010/0274982 A1 | 10/2010 | Mehr et al. | |
| 2010/0332452 A1 | 12/2010 | Hsu et al. | |

OTHER PUBLICATIONS

"Xmas: An Extensible Main-Memory Storage System for High-Performance Applications," by Park et al. IN: SIGMOD '98 (1998). Available at: ACM.*

U.S. Appl. No. 11/404,105 entitled Routing, filed Apr. 13, 2006.

U.S. Appl. No. 11/403,379 entitled Parallel Backup, filed Apr. 13, 2006.

U.S. Appl. No. 11/641,389, filed Dec. 18, 2006 entitled "Single Instance Storage".

* cited by examiner

SYSTEM AND METHOD FOR EVENT DRIVEN BACKUP DATA STORAGE

BACKGROUND OF THE INVENTION

1. Field of the Invention

The present invention relates generally to backup storage systems, and in particular to deduplication based systems storing backup data from multiple clients.

2. Description of the Related Art

Backup storage servers perform multiple tasks, and ideally perform the tasks quickly and efficiently. The tasks may include receiving data from clients, storing data, maintaining a database of metadata (sometimes referred to as a "metabase"), transferring data between separate storage devices, and restoring data to clients. At times, clients may be restricted from sending data for backup if the other tasks are dominating the resources of the backup storage server. Preferably, the periods of time when the backup server is unable to receive new client data that a client desires to send should be minimized.

In a typical deduplication based backup system, many clients may be sending data segments to a deduplication backup server at the same time. The backup server may store segments from each individual client in a relatively localized manner in a backup storage medium to facilitate future restore operations, since segments from the same client have spatial locality and may be read together during restore time. Keeping data for each client together (generally speaking) may become a challenge when data from multiple clients is being received and processed concurrently.

Backup servers also confront other problems when receiving and processing data for multiple clients concurrently. For example, backup servers may be unable to receive new backup data from clients while committing transactions involving already received backup data. The server may commit a transaction from a client after all of the data from that client for a particular backup transaction has been received by the server. Committing the transaction may include flushing and synchronizing all open container files and container index files, closing the container and container index files, and updating the backup server's metadata (e.g., metabase). The metabase may contain information about which segments belong to which client, their location in the storage medium, and links to identical segments in the storage medium from segments that have been deduplicated.

In some embodiments, the receiving server may use one or more buffers to temporarily store received data. During the transaction commit time, the server may be unable to move data out of the temporary buffers in system memory to the backup storage medium. If the commit time is long enough, the buffers may reach maximum capacity and not be able to store newly received data. To prevent the buffers from overflowing, clients may be prevented from sending new data to the backup server. Therefore, if the amount of time spent by the backup server committing transactions can be reduced, the amount of time clients are restricted from sending backup data to the backup server may also be reduced.

In view of the above, improved methods and mechanisms for managing data storage are desired.

SUMMARY OF THE INVENTION

Various embodiments of methods and mechanisms for managing a backup server and process are contemplated. In one embodiment, a backup server may flush the contents of full containers to the backup storage medium prior to transaction commit time. As a result, the transaction commit time may be reduced as there may be fewer containers open to be flushed and closed during the commit time. Reducing the transaction commit time may also reduce the zero inbound period when clients are restricted from sending data to the backup server; reducing the zero inbound period may be a key factor for improving overall backup system performance.

Also, the data may be received and read in from clients using multiple read threads, to increase the speed at which data may be received from clients and placed into temporary buffers. In addition, multiple write threads may write data out of the temporary buffers and into a backup storage medium, to increase the speed at which the temporary buffers may be cleared. These methods may increase the speed at which data is written to the backup storage medium.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, signals, computer program instructions, and techniques have not been shown in detail to avoid obscuring the approaches described herein.

Figure 1:
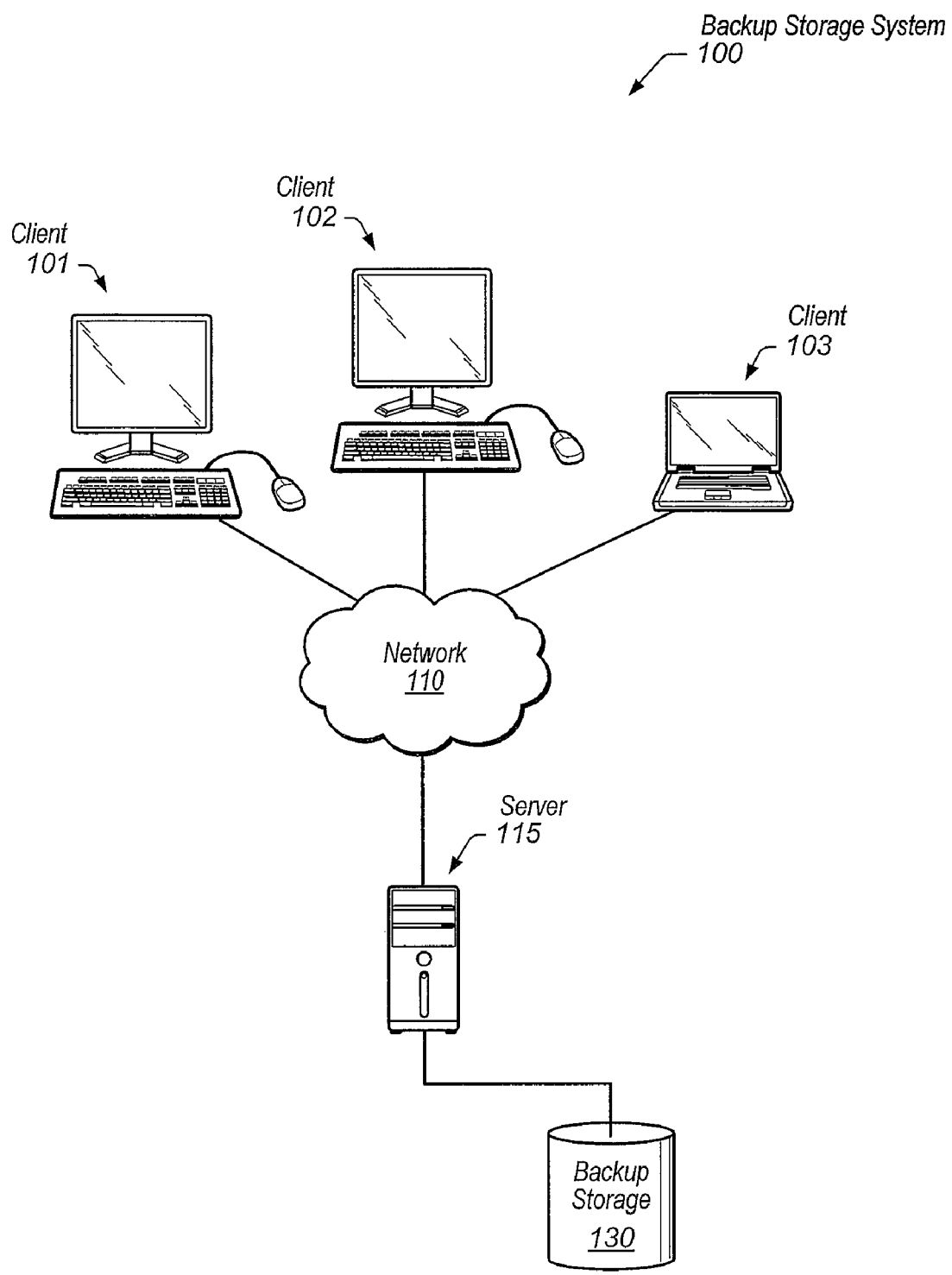
FIG. 1 illustrates one embodiment of a backup storage system.

FIG. 1 illustrates one embodiment of a backup storage system 100. The backup storage system 100 includes clients 101, 102 and 103 that are representative of any number of mobile or stationary clients. While this figure shows the examples of two desktop computers and a laptop computer as clients, other client devices including personal digital assistants, cell phones, smartphones, digital cameras, video cameras, wireless reading devices, and any other types of electronic devices capable of sending and receiving data are possible and are contemplated. As shown in FIG. 1, the clients are connected to a network 110 through which they are also connected to the server 115. The server 115 may be a deduplication server as part of a deduplication backup system. Alternatively, the server 115 may be part of a backup data system not utilizing deduplication. Also, the backup storage system 100 may include one or more servers 115.

The server 115 is also connected to backup storage 130, where data from clients 101, 102, and 103 may be stored. Backup storage 130 may include one or more data storage devices of varying types, such as hard disk drives, optical drives, magnetic tape drives, and others.

One or more of the clients coupled to network 110 may also function as a server for other clients. The approaches described herein can be utilized in a variety of networks, including combinations of local area networks (LANs), such as Ethernet networks, Fiber Distributed Data Interface (FDDI) networks, token ring networks, and wireless local area networks (WLANs) based on the Institute of Electrical and Electronics Engineers (IEEE) 802.11 standards (Wi-Fi), and wide area networks (WANs), such as the Internet, cellular data networks, and other data communication networks. The networks served by the approaches described herein may also contain a plurality of backup storage media 130, depending on the unique storage and backup requirements of each specific network. Storage media associated with the backup storage 130 may be implemented in accordance with a variety of storage architectures including, but not limited to, a network-attached storage environment, a storage area network (SAN), and a disk assembly directly attached to the server 115.

Clients 101-103 may send data over the network 110 to the server 115. The data may be sent in the form of data segments that have been created by partitioning the data stored on the clients 101-103 into pieces of one or more predetermined sizes. In various embodiments, clients may include software that assists in backup operations (e.g., a backup agent). In some embodiments, server 115 may deduplicate received data. Deduplication typically entails determining whether received data is already stored in backup storage 130. If the data is already stored in backup storage 130, the received data may be discarded and a pointer to the already stored data used in its place. In this manner, the server may seek to maintain only a single instance of any data in backup storage 130. In other embodiments. a deduplication process may take place prior to the data segments being sent to the server 115, so that only new data segments may be sent to the server 115, and all redundant data segments may be deleted at the clients 101-103.

In other embodiments, the data may also be sent from the clients 101-103 to the server 115 as complete data files, as a plurality of data files copied from an image file or a volume, as a virtual machine disk file (VMDK), as a virtual hard disk (VHD), as a disk image file (.V2I) created by SYMANTEC® BackupExec software products, as a .TAR archive file that further includes a VMDK file for storing the data files as a raw disk partition, or as otherwise may be formatted by the clients 101-103.

Figure 2:
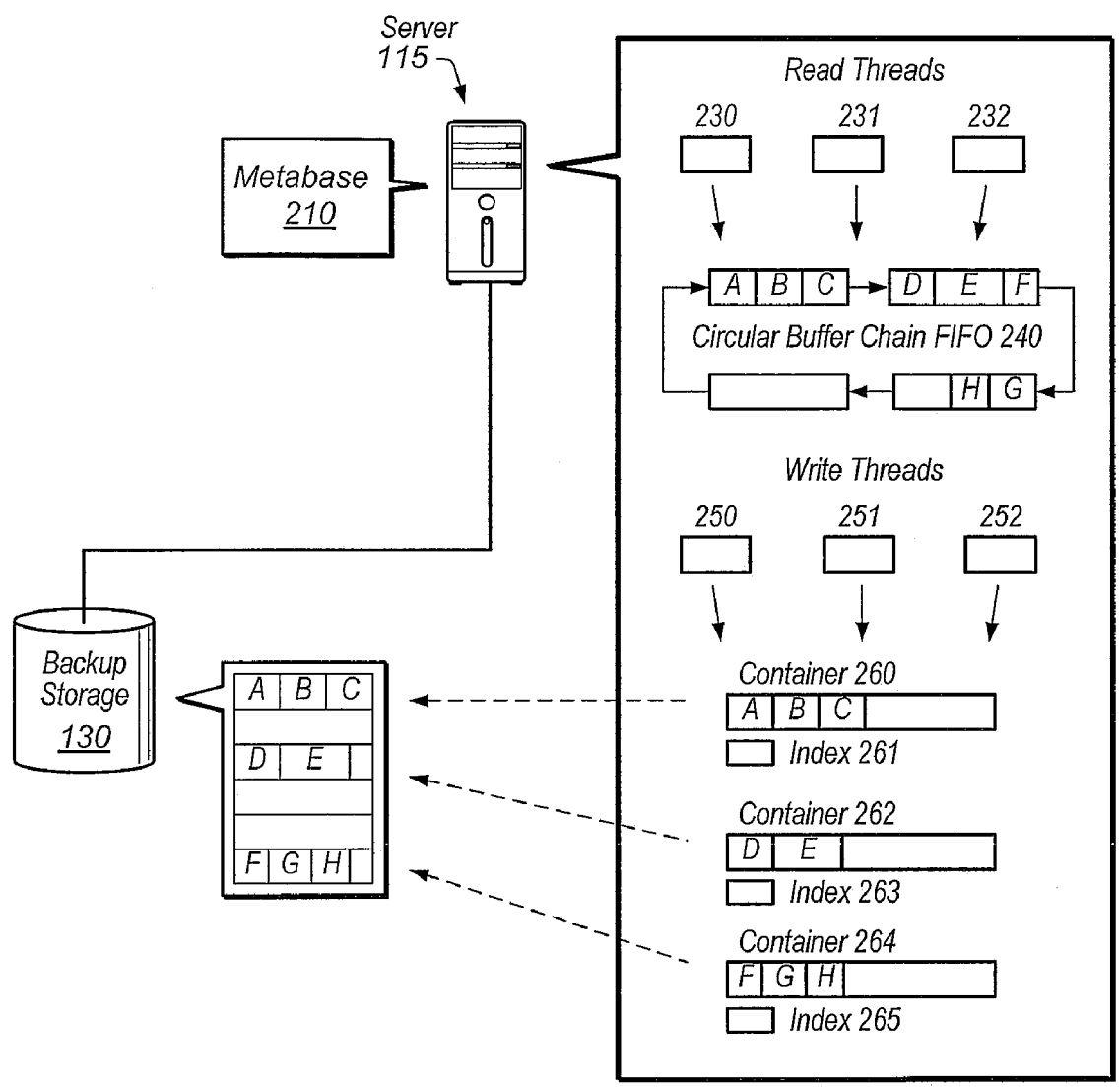
FIG. 2 illustrates one embodiment of a backup server.

Referring now to FIG. 2, one embodiment of a server 115 and backup storage 130 are shown. In the embodiment shown, server 115 includes read threads (230, 231, 232), buffer (240), write threads (250, 251, 252), containers (260, 262, 264), and container index files (261, 263, 265). As previously mentioned, the server 115 may receive data segments from one or more clients. The data segments sent by the clients and received by the server 115 may be of variable sizes. In some embodiments, each segment received over the network may be relatively small, possibly less than 1 megabyte (MB), and writing each segment to the backup storage 130 individually may require many random storage accesses which may in turn slow down the server 115. Rather than writing small amounts of data a large number of times, larger amounts of data may be collected before performing a write operation.

To ensure more data is written during each storage write operation, a set of receiving buffers organized into a circular first-in, first-out (FIFO) buffer chain 240 may be used to temporarily hold incoming segments from all clients. The circular buffer chain FIFO 240 may reside in a volatile storage medium, such as the server's system memory. In other embodiments, buffers organized in forms other than a FIFO queue or circular chain may be used. Further, while the following discussion generally describes buffer 240 as a singular entity, in various embodiments multiple buffers may be used. For example, a separate buffer may be allocated for each client. Alternatively, a buffer may be logically partitioned into multiple logical buffers—each for use by one or more particular threads, clients, or otherwise. Numerous such alternatives are possible and are contemplated.

The server 115 may use multiple threads for processing data. Such threads may include read threads 230, 231, and 232 to read the data segments received from the clients and then store the segments in the buffer 240. Three read threads 230-232 are depicted in the figure, but any number may be utilized by the server 115. In one embodiment, there may be a single read thread for each client, with the read thread only processing data from a specific client. In other embodiments, there may be multiple read threads for each client. In a further embodiment, there may be more clients than read threads, and some read threads may read data from more than one client. Numerous such combinations are possible and are contemplated.

In one embodiment, the read threads 230-232 may store data segments from each individual client into separate sections of the buffer 240. Data segments A-H are shown in the buffer 240. Data segments A, B, and C may belong to a first client (not shown), data segments D and E may belong to a second client, and segments F, G, and H may belong to a third client. The data segments from each client may be stored in contiguous locations within the buffer 240, as shown in FIG. 2. Or, alternatively, data segments from different clients may be interleaved in the buffer 240.

As the buffer 240 fills, the multiple write threads 250, 251, and 252 may simultaneously write data segments from the buffer 240 into different storage containers 260, 262, and 264. In one embodiment, storage containers 260, 262, and 264 may be variable-sized portions of a file system that include a number of allocated units of data storage. Data segments may be written from the buffer 240 into containers through file system write calls. Container 260 may store data segments A, B, and C from the first client, container 262 may store data segments D and E from the second client, and container 264 may store data segments F, G, and H from the third client. In one embodiment, each container may contain data segments from only one client. Also, each client may have a separate section of the backup storage 130 to store their own data segments; maintaining separate sections in the backup storage 130 for each client may facilitate efficient restore operations.

The three write threads 250-252 are representative of any number of write threads. As with read threads, there may be a single write thread for each client, with the write thread only writing data from a specific client to the containers. In another embodiment, there may be multiple write threads for each client. In a further embodiment, there may be more clients than write threads, and some write threads may be responsible for writing data from more than one client to the containers. Numerous such combinations are possible and are contemplated.

Also, while three containers 260, 262, and 264 are depicted, any number of containers may be utilized. The containers may be stored in a variety of storage media, including in system memory, in file system buffers, in the backup storage medium 130, or in some other storage medium. Also, a portion of an individual container may reside in the system memory and the remainder of that container may reside in the backup storage medium 130. Other containers may be stored in a similar fashion with their contents split between different storage media. In one embodiment, all of the containers may be the same size. In other embodiments, the sizes of the containers may vary. For example, the sizes of the containers may be determined in part by the amount of data being sent from each client. Other factors may also influence the sizes of the containers.

Metadata associated with the data segments may also be stored. For example, the data segments may be written into container 260 while the corresponding metadata information may be written into a file or location, such as index file 261. Similarly, metadata associated with the data segments stored in container 262 may be stored in index file 263, and metadata for the data segments stored in container 264 may be stored in index file 265. The data written to the index files 261, 263, and 265 may be generated by file system write calls. The index files may comprise many different forms or structures within any of a variety of types of storage media. In one embodiment, the index files may be storage container files similar to containers 260, 262, and 264. In another embodiment, the index files may be part of a file system. The index files may reside in the system memory, in file system buffers, in backup storage 130, or in another storage medium.

In one embodiment, data segments from a given client may be stored in a single container until the container is full. When the container is full, a new container may be opened to hold additional data segments from the same client. In one embodiment, the data in the full container may be flushed to backup storage 130 and then the container may be closed. For example, a function such as the "fdataync" function found in UNIX® type file systems may be used to flush the contents of containers. Such a command, or any similar command, may be operable to flush the contents of the container(s), and possibly close the flushed container(s), without performing a corresponding update to metadata. By avoiding an immediate update to the corresponding metadata, performance may be improved. Also, different methods may be used to flush and close the container. For example, a command such as "FlushFileBuffers" found in Microsoft® Windows® operating systems may be used. Alternatively, a user developed command to perform the above desired flushing may be utilized.

In another embodiment, instead of flushing and closing the full container, the full container may be marked as ready and the container or a pointer to the container may be place in a ready queue. Containers in the ready queue may be flushed to backup storage 130 and closed as backup storage input/output (I/O) bandwidth becomes available. There may be a software thread or process that checks for available backup storage I/O bandwidth, and after determining bandwidth is available, the thread may flush containers in the ready queue. Alternatively, the software thread or process checking for available backup storage I/O bandwidth may notify a separate thread or process to flush containers in the ready queue. In a further embodiment, the server 115 may use other factors to determine when to flush a specific container. For example, the server 115 may determine when to flush a container based in part on the amount and size of data segments written to that container.

In one embodiment, a transaction may comprise a single client sending a specific amount of data containing a plurality of data segments to the server 115. The client may initiate a request for a transaction with the server 115, and then the server 115 may respond with an acknowledgement. The client may indicate the amount of data it will be sending as part of the transaction. After all of the data from the client has been received by the server and stored in containers and in backup storage 130, the server may perform a transaction commit operation.

During the transaction commit operation, the metabase 210 may be updated with metadata associated with the received data. In one embodiment, metabase 210 may be updated with metadata corresponding to data stored in index files 261, 263, and 265. In another embodiment, a backup transaction log may be committed to update the metabase.

Also during the transaction commit time, any open container files may be flushed and closed. In one embodiment, the function fdatasync may be applied to each open container file during the transaction commit operation. To reduce the number of containers that are open at commit time, a full container may be flushed and closed when it becomes full rather than waiting until a transaction commit is called. Reducing the number of containers that are open and need to be flushed at commit time may reduce the duration of the commit time. In this manner, the commit time may effectively be amortized over the life of a transaction(s), rather than occurring entirely at the end of such a transaction. As the server 115 may be restricted from receiving data from clients during commit time(s), a reduction in the commit time may reduce the likelihood of buffer overflow and reduce the probability that one or more clients may be unable to send data to the server 115 for storage.

In addition to the above, a container that is not yet full may be flushed if certain conditions are met. One of these conditions may be that no more data will be sent to that specific container. Another such condition may be that the amount of data in the container has reached a particular size. A further condition may be that the client is not sending any more data for the present transaction. In addition, multiple containers may be flushed and closed simultaneously to fully utilize the available backup storage I/O bandwidth.

Figure 3:
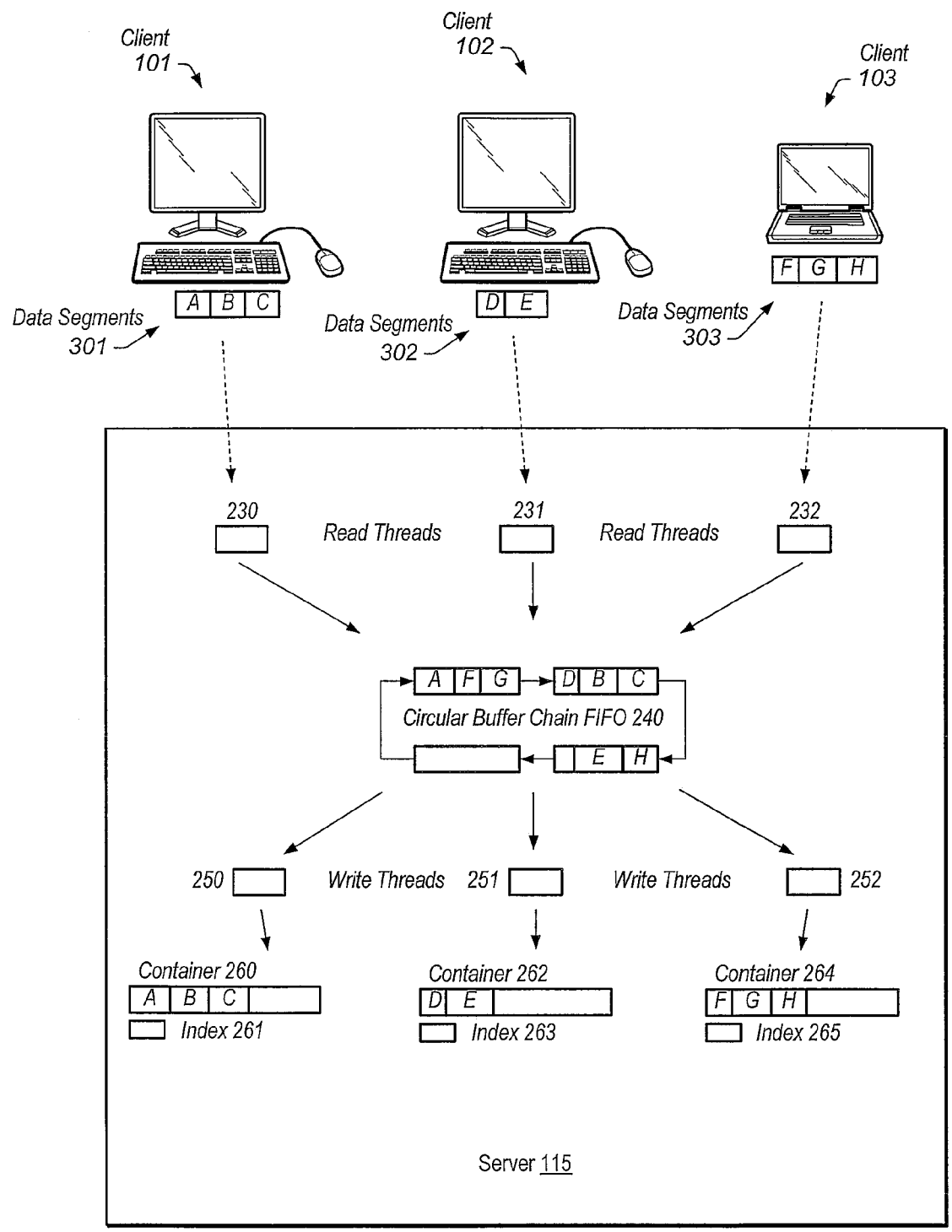
FIG. 3 illustrates one embodiment of a backup server managing and storing data segments.

Referring now to FIG. 3, one embodiment of a server 115 managing and storing data segments from clients 101, 102, and 103 is illustrated. Client 101 may have data segments 301 (A, B, and C) which it may convey to server 115. Client 102 may have data segments 302 (D and E) which it may convey to server 115. Client 103 may have data segments 303 (F, G, and H) which it may convey to server 115. Clients 101, 102, and 103 are representative of any number of clients which may send data for backup storage to server 115. Also, clients 101, 102, and 103 may be connected to server 115 over any of a variety of different networks, as previously noted, or they may be connected directly to server 115.

In one embodiment, there may be a single read thread 230 assigned to client 101. The read thread 230 may read the data segments A, B, and C from client 101 and may write them to the circular buffer chain FIFO 240. There may also be a single read thread 231 assigned to client 102. The read thread 231 may read the data segments D and E from client 102 and may write them to the buffer 240. There may also be a single read thread 232 assigned to client 103. The read thread 232 may read the data segments F, G, and H from client 103 and may write them to the buffer 240. The read threads 230-232 may be simultaneously writing data segments to the buffer 240, and the data segments from clients 101, 102, and 103 may be interleaved in the buffer 240.

There may be a single write thread 250 assigned to client 101. The write thread 250 may convey the data segments A, B, and C from the buffer 240 to container 260. Write thread 250 may also write metadata associated with the data segments A, B, and C to index file 261. Or a separate thread or process may write metadata to index file 261. Container 260 and index file 261 may be allocated to store data and metadata from only client 101.

There also may be a single write thread 251 assigned to client 102. The write thread 251 may convey the data segments D and E from the buffer 240 to container 262. Write thread 251 may also write metadata associated with the data segments D and E to index file 263. Alternatively, a separate thread or process may write metadata to index file 263. Container 262 and index file 263 may be allocated to store data and metadata from only client 102.

There also may be a single write thread 252 assigned to client 103. The write thread 252 may convey the data segments F, G, and H from the buffer 240 to container 264. Write thread 252 may also write metadata associated with the data segments F, G, and H to index file 265. Or a separate thread or process may write metadata to index file 265. Container 264 and index file 265 may be allocated to store data and metadata from only client 103.

As data segments accumulate in the buffer 240, write threads 250-252 may write the segments to containers 260, 262, and 264 and metadata to index files 261, 263, and 265. As the containers become full, additional containers may be opened and write threads 250-252 may write the latest data segments from the buffer 240 to the new containers; each new container may be assigned to a specific client.

Data segments may be kept in containers assigned to individual clients to facilitate storing data from each client in adjoining storage areas within the backup storage medium. The data segments may be transferred from the containers to the backup storage medium on an event-driven basis, with the segments from each client grouped together. Storing data segments from each client at locations in close proximity within the backup storage medium may allow for relatively fast and efficient data restoration operations.

Figure 4:
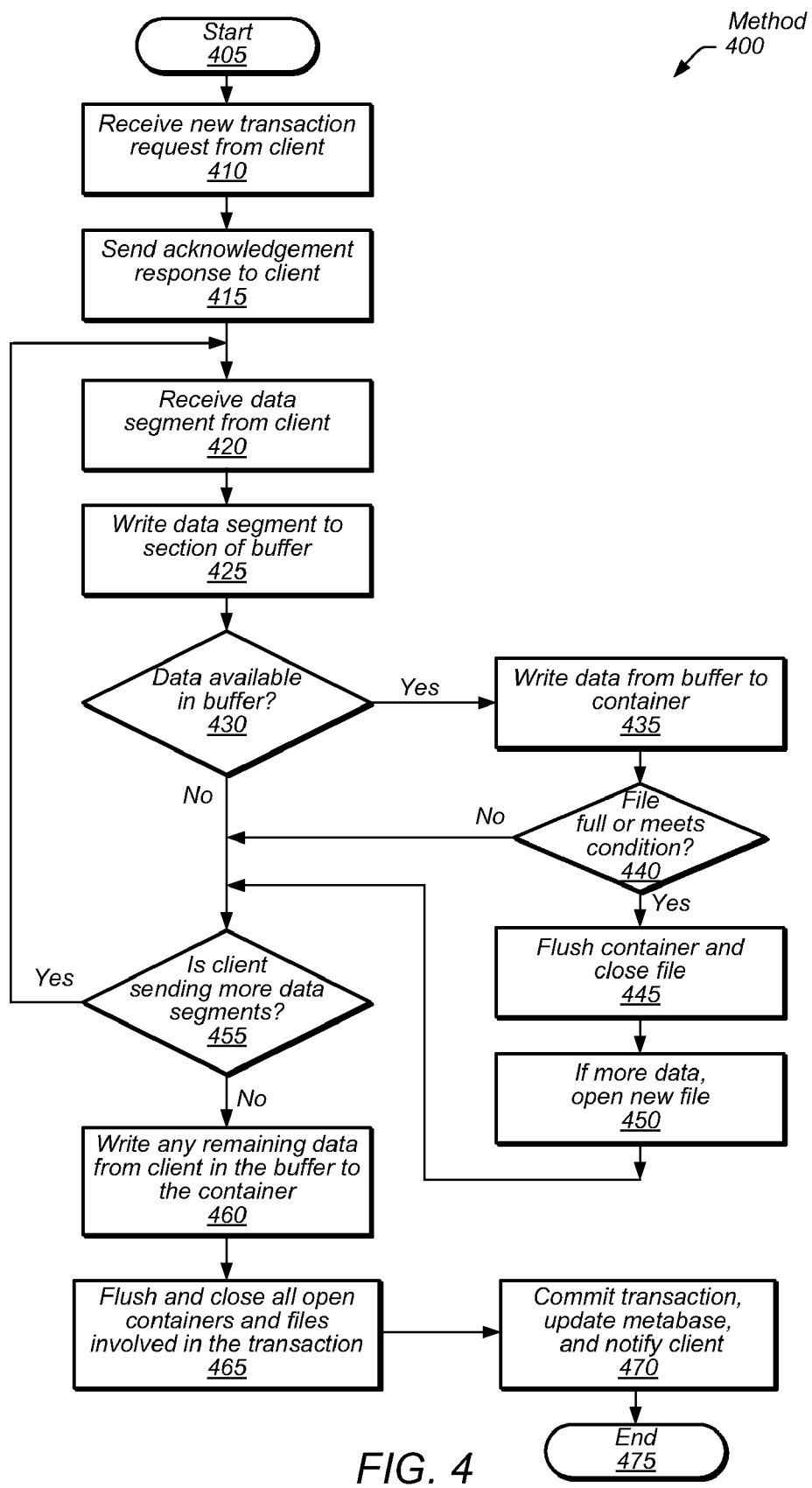
FIG. 4 is a generalized flow diagram illustrating one embodiment of a method to process a backup data transaction.

Referring now to FIG. 4, one embodiment of a method 400 for processing a backup data transaction is illustrated. For purposes of discussion, the steps in this embodiment are shown in sequential order. However, some steps may occur in a different order than shown, additional steps not shown may occur, some steps may be performed concurrently, some steps may be combined with other steps, and some steps may be absent in another embodiment.

The method starts in block 405, and then the server 115 (from FIG. 1) may receive a backup data transaction request from a client in block 410. In block 415, the server may send an acknowledgement response to the client, which may direct the client to immediately begin sending data, or may direct the client to wait for a specified amount of time before sending data. Next, the server may receive a data segment from the client in block 420. After receiving a data segment, the server may write the data segment to a section of a buffer (block 425). In one embodiment, data for a given client may be written to a buffer, or a section/portion of a buffer, designated for storing the given client's data. The server may contain multiple read threads that concurrently read segments from different clients and write the data to separate sections of a buffer. Or in another embodiment, the server may write the data segments to a buffer in the order in which it receives them; this may result in the data segments from different clients being interleaved in the buffer.

In conditional block 430, the server may determine if the section of the buffer is full or has otherwise accumulated a given amount of data. If so, then the server may write data from the buffer to the corresponding container for that client (block 435). Alternatively, data may be retrieved from the buffer at any time desired. The server may utilize multiple write threads that concurrently write data from multiple sections of the buffer to separate containers. If the section is not full (conditional block 430), then the server may determine if the client is sending more data segments (conditional block 455).

After writing data from the buffer to the container (block 435), the server may check to see if the file that corresponds to the container is full or has otherwise reached a given size (conditional block 440). If the file meets one of these conditions, then the server may flush and close the container and file (block 445). It is noted that a flush may occur prior to checking whether a given file has reached a particular size or meets a given condition. Flushing the container may involve writing the data from the container to the backup storage. If the file does not meet such a condition (conditional block 440), then the next step may be checking to see if the client is sending more data segments (conditional block 455).

After flushing and closing the container and file (block 445), the server may open up a new file for storing additional client data segments (block 450). After opening a new file, the server may check to see if the client is sending more data segments (conditional block 455). In some embodiments, the server may have access to information regarding the total amount of data the client will be sending, and also how much data has already been received from the client. The client may send information detailing how much backup data it needs to store for the transaction. In one embodiment, the client may send this information to the server when initiating a backup storage request.

If the client is sending more data segments (conditional block 455), then the server may return to block 420 and receive another data segment from the client. If the client is not sending more data segments (conditional block 455), then the server may write any remaining client data segments in the buffer to the container (block 460). Next, the server may flush and close all open containers and files involved in the transaction (block 465). Then, the server may commit the transaction, update the metabase, and notify the client that the data has been stored (block 470). After this block, then the method may end (block 475). Multiple clients may be sending data segments for backup storage to the server at the same time, and the method illustrated in FIG. 4 may be implemented many times simultaneously. The software running on the server may be configured to run multiple processes or threads concurrently to manage and store data from multiple clients.

Figure 5:
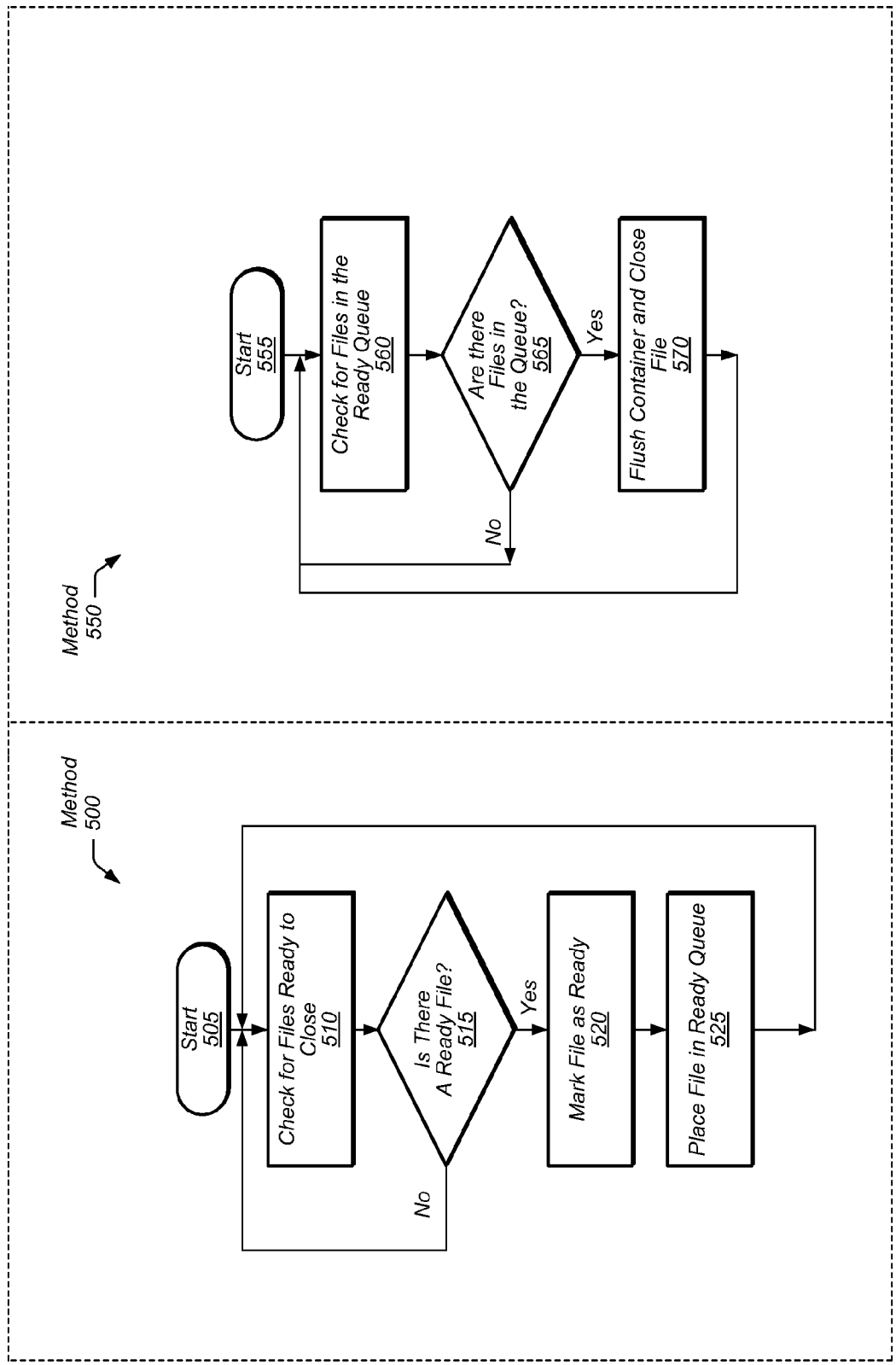
FIG. 5 illustrates generalized flow diagrams of embodiments of two methods: one method marks files as ready, and the second method flushes and closes containers and files.

Turning now to FIG. 5, embodiments of two methods 500 and 550 on placing files in a ready queue and flushing and closing containers and files are shown. For purposes of discussion, the steps in these embodiments are shown in sequential order. However, some steps may occur in a different order than shown, additional steps not shown may occur, some steps may be performed concurrently, some steps may be combined with other steps, and some steps may be absent in other embodiments.

The method 500 starts in block 505, and then the server 115 (from FIG. 1) may check for files ready to be closed in block 510. In conditional block 515, the server may determine if there is a file that is ready to be closed. For example, as discussed above, a file that is full, has reached a given size, or otherwise meets some condition, may be deemed ready. If there is a ready file, then the server may mark the file as ready (block 520). Next, the server may place the file, or a pointer to the file, in a ready queue (block 525). After block 525, the server may return to block 510 to check for files ready to be closed.

The method 550 starts in block 555, and then the server checks for files in the ready queue (block 560). If there is a file in the ready queue (conditional block 565), then the server may flush the container and close the file (block 570). If there are no files in the ready queue (conditional block 565), then the server may return to block 560 to check for files in the ready queue. In another embodiment, the server may wait a certain amount of time after leaving block 565 and before returning to block 560. In a further embodiment, the server may wait for an interrupt or other signal alerting it that a file has been added to the ready queue before returning to block 560. After flushing the container(s) and closing the file (block 570), the server may return to block 560 to check for files in the ready queue.

Method 500 and method 550 may run concurrently in the server. Each method may run as a single thread or process on the server. In one embodiment, there may be multiple methods 500 and methods 550 running simultaneously to place files in the ready queue and to flush and close containers and files for multiple clients. In other embodiments, method 500 and method 550 may be combined together into a single thread or process, or some steps of method 500 may be incorporated in method 550, or some steps of method 550 may be incorporated in method 500.

Figure 6:
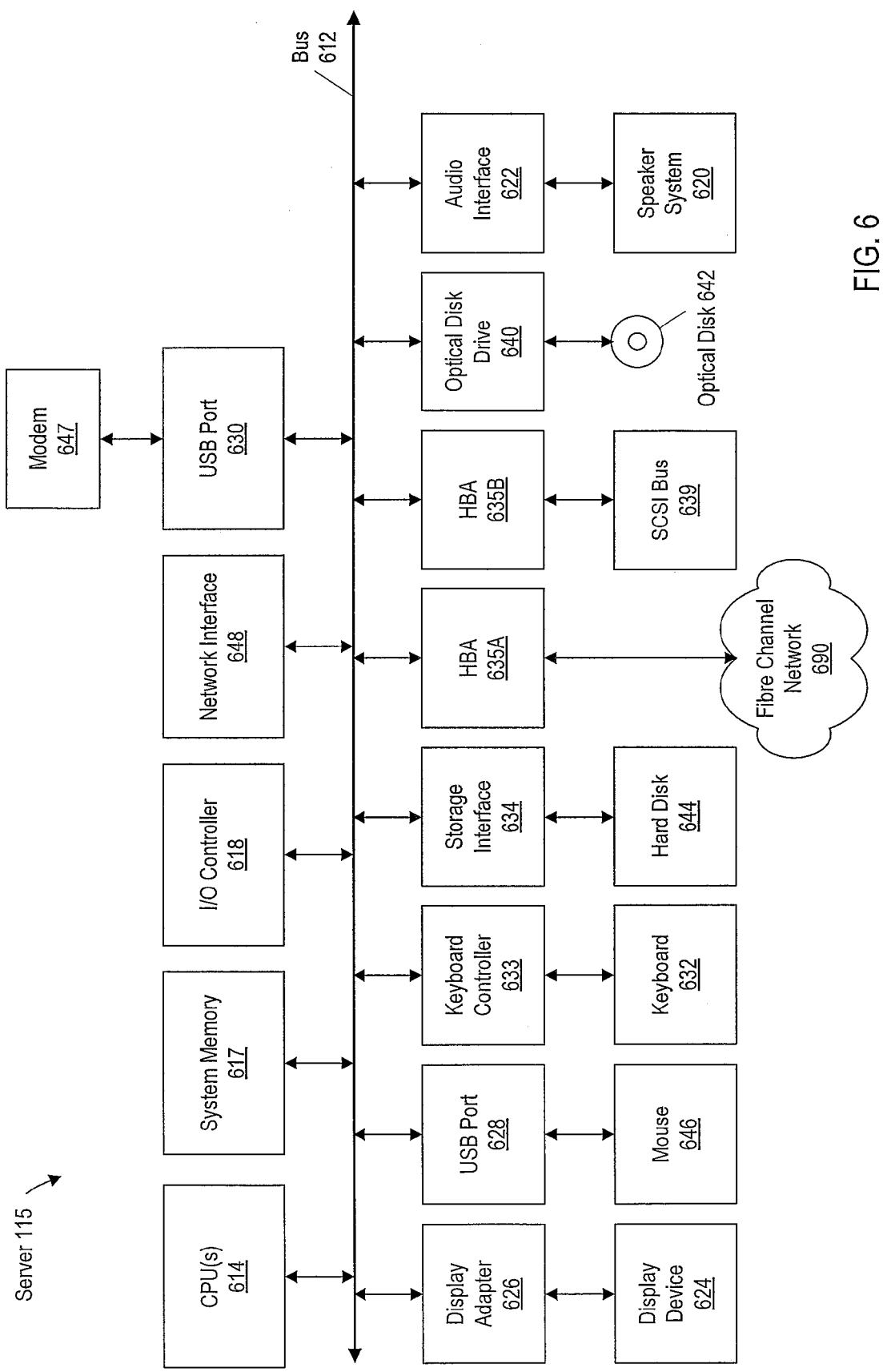
FIG. 6 illustrates one embodiment of a backup server and its physical components.

Turning now to FIG. 6, one embodiment of a server 115 is illustrated. In general, the server 115 may be any type of physical computer or computing device, and FIG. 6 is provided as an example only. The server 115 may include a bus 612 which may interconnect major subsystems or components of the server 115, such as one or more central processor units (CPUs) 614, system memory 617 (random-access memory (RAM), read-only memory (ROM), flash RAM, or the like), an input/output (I/O) controller 618, an external audio device, such as a speaker system 620 via an audio interface 622, an external device, such as a display screen 624 via a display adapter 626, USB ports 628 and 630, a keyboard 632 (interfaced with a keyboard controller 633), a storage interface 634, a host bus adapter (HBA) interface card 635A operative to connect with a Fibre Channel network 690, a host bus adapter (HBA) interface card 635B operative to connect to a SCSI bus 639, and an optical disk drive 640 operative to receive an optical disk 642. The server 115 may also include a mouse 646 (or other point-and-click device, coupled to bus 612 via Universal Serial Bus (USB) port 628), a modem 647 (coupled to bus 612 via USB port 630), and a network interface 648 (coupled directly to bus 612).

The bus 612 may allow data communication between CPU(s) 614 and system memory 617, which may include (ROM), flash memory, and/or (RAM), as previously noted. The RAM may be the main memory into which software programs are loaded. The ROM or flash memory may contain, among other code, the Basic Input-Output system (BIOS) which may control basic hardware operations such as the interaction with peripheral components. Software running on the server 115 may be stored on and accessed via a computer-readable medium, such as a hard disk drive (e.g., fixed hard disk 644), an optical drive (e.g., optical disk drive 640), or other storage medium. Additionally, software may be received through the modem 647 or network interface 648.

The storage interface 634 may connect to a standard computer-readable medium for storage and/or retrieval of information, such as one or more hard disks 644. The CPU(s) 614 running software stored in system memory 617 may store the data received from clients on the hard disk(s) 644. In another embodiment, the CPU(s) 614 may also, or may alternatively, store the data segments in an external backup storage 130 (from FIG. 1). In a further embodiment, the backup storage 130 may be coupled to the server 115 through the fibre channel network 690. In other embodiments, the storage device used to store client data may be coupled to the server 115 through any of various other types of storage interfaces or networks. Also, client data may be stored on any of various other types of storage devices included in or coupled to the server 115, such as tape storage devices, for example.

Many other devices or subsystems (not shown) may be connected to the server 115 in a similar manner. Conversely, all of the devices shown in FIG. 6 need not be present to implement the approaches described herein. The devices and subsystems can be interconnected in different ways from that shown in FIG. 6. Software intended to run on the server 115 may be stored in computer-readable storage media such as one or more of system memory 617, hard disk 644, or optical disk 642. The operating system provided on the server 115 may be a Microsoft Windows® operating system, UNIX® operating system, Linux® operating system, or other operating system.

It is noted that the above-described embodiments may comprise software. In such an embodiment, program instructions and/or a database (both of which may be referred to as "instructions") that represent the described systems and/or methods may be stored on a computer readable storage medium. Generally speaking, a computer readable storage medium may include any storage media accessible by a computer during use to provide instructions and/or data to the computer. For example, a computer readable storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM, etc.), ROM, Flash memory, non-volatile memory (e.g. Flash memory) accessible via a peripheral interface such as the USB interface, etc. Storage media may include micro-electro-mechanical systems (MEMS), as well as storage media accessible via a communication medium such as a network and/or a wireless link.

In various embodiments, one or more portions of the methods and mechanisms described herein may form part of a cloud computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although several embodiments of approaches have been shown and described, it will be apparent to those of ordinary skill in the art that a number of changes, modifications, or alterations to the approaches as described may be made. Changes, modifications, and alterations should therefore be seen as within the scope of the methods and mechanisms described herein. It should also be emphasized that the above-described embodiments are only non-limiting examples of implementations.

What is claimed is:

1. A system for managing backup data storage, comprising:
a backup storage device; and
a server coupled to the storage device, wherein the server is configured to:
detect a transaction from a client to store data, said transaction comprising a plurality of data segments corresponding to a plurality of files;
receive at least a portion of the plurality of data segments into a buffer, said buffer being configured to store data corresponding to a plurality of clients;
open a first storage container corresponding to a first file in the storage device and convey a subset of the plurality of data segments from the buffer to the first storage container, wherein a storage container comprises a temporary storage location for received data segments;
open a second storage container corresponding to a second file in the storage device and convey a subset of the plurality of data segments from the buffer to the second storage container;
flush data from the first storage container to the backup storage device and close the first storage container prior to conveying all data of the transaction to the storage device; and
commit the transaction subsequent to writing all data for the transaction to the backup storage device, wherein said commit comprises flushing and closing any storage containers corresponding to the transaction which remain open and updating metadata associated with the data segments.

2. The system as recited in claim 1, wherein the server is further configured to flush said data from the first storage container to the storage device and close the first storage container in response to detecting an occurrence of an event.

3. The system as recited in claim 2, wherein the event comprises either an amount of data in the first storage container has reached a given size, or determining no further data is to be written to the first storage container.

4. The system as recited in claim 1, wherein the first file stores backup data exclusive to a first client, and the second file stores backup data exclusive to a second client.

5. The system as recited in claim 1, wherein the server is further configured to:
determine if the storage device has input/output bandwidth available; and
convey the subset of data segments from the container to the storage device if the bandwidth is available.

6. The system as recited in claim 1, wherein a size of the first file and second file is determined based at least in part on an amount of data being sent from clients.

7. The system as recited in claim 1, wherein the server is further configured to utilize multiple write threads to simultaneously convey data segments from the buffer to a plurality of containers.

8. A computer implemented method comprising:
detecting a transaction from a client to store data, said transaction comprising a plurality of data segments corresponding to a plurality of files;
receiving at least a portion of the plurality of data segments into a buffer, said buffer being configured to store data corresponding to a plurality of clients;
opening a first storage container corresponding to a first file in the storage device and convey a subset of the plurality of data segments from the buffer to the first storage container, wherein a storage container comprises a temporary storage location for received data segments;
opening a second storage container corresponding to a second file in the storage device and convey a subset of the plurality of data segments from the buffer to the second storage container;
flushing data from the first storage container to the backup storage device and closing the first storage container prior to conveying all data of the transaction to the storage device; and
committing the transaction subsequent to writing all data for the transaction to the backup storage device, wherein said committing comprises flushing and closing any storage containers corresponding to the transaction which remain open and updating metadata associated with the data segments.

9. The method as recited in claim 8, further comprising flushing said data from the first storage container to the storage device and closing the first storage container in response to detecting an occurrence of an event.

10. The method as recited in claim 9, wherein the event comprises either an amount of data in the first storage container has reached a given size, or determining no further data is to be written to the first storage container.

11. The method as recited in claim 8, wherein the first file stores backup data exclusive to a first client, and the second file stores backup data exclusive to a second client.

12. The method as recited in claim 8, further comprising:
determining if the storage device has input/output bandwidth available; and
conveying the subset of data segments from the container to the storage device if the bandwidth is available.

13. The method as recited in claim 8, wherein a size of the first file and second file is determined based at least in part on an amount of data being sent from clients.

14. The method as recited in claim 8, further comprising utilizing multiple write threads to simultaneously convey data segments from the buffer to a plurality of containers.

15. A computer readable storage medium comprising program instructions, wherein when executed the program instructions are operable to:
detect a transaction from a client to store data, said transaction comprising a plurality of data segments corresponding to a plurality of files;
receive at least a portion of the plurality of data segments into a buffer, said buffer being configured to store data corresponding to a plurality of clients;
open a first storage container corresponding to a first file in the storage device and convey a subset of the plurality of data segments from the buffer to the first storage container, wherein a storage container comprises a temporary storage location for received data segments;
open a second storage container corresponding to a second file in the storage device and convey a subset of the plurality of data segments from the buffer to the second storage container;
flush data from the first storage container to the backup storage device and close the first storage container prior to conveying all data of the transaction to the storage device; and
commit the transaction subsequent to writing all data for the transaction to the backup storage device, wherein said commit comprises flushing and closing any storage containers corresponding to the transaction which remain open and updating metadata associated with the data segments.

16. The computer readable storage medium as recited in claim 15, wherein when executed the program instructions are further operable to flush said data from the first storage container to the storage device and close the first storage container in response to detecting an occurrence of an event.

17. The computer readable storage medium as recited in claim 16, wherein the event comprises either an amount of data in the first storage container has reached a given size, or determining no further data is to be written to the first storage container.

18. The computer readable storage medium as recited in claim 15, wherein the first file stores backup data exclusive to a first client, and the second file stores backup data exclusive to a second client.

19. The computer readable storage medium as recited in claim 15, wherein when executed the program instructions are further operable to:
   determine if the storage device has input/output bandwidth available; and
   convey the subset of data segments from the container to the storage device if the bandwidth is available.

20. The computer readable storage medium as recited in claim 15, wherein when executed the program instructions are further operable to utilize multiple write threads to simultaneously convey data segments from the buffer to a plurality of containers.

* * * * *